US012273389B2

(12) United States Patent
Kuo et al.

(10) Patent No.: US 12,273,389 B2
(45) Date of Patent: Apr. 8, 2025

(54) SMART SDN FOR INTRUSION PREVENTION

(71) Applicant: INTERNATIONAL BUSINESS MACHINES CORPORATION, Armonk, NY (US)

(72) Inventors: Jeff Hsueh-Chang Kuo, Taipei (TW); June-Ray Lin, Taipei (TW); Ying-Chen Yu, Taipei (TW); Chih-Wen Su, Shihlin (TW)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/655,821

(22) Filed: Mar. 22, 2022

(65) Prior Publication Data

US 2023/0308483 A1  Sep. 28, 2023

(51) Int. Cl.
*H04L 9/40* (2022.01)
*G06F 21/53* (2013.01)
*G06F 21/55* (2013.01)

(52) U.S. Cl.
CPC .............. *H04L 63/20* (2013.01); *H04L 63/02* (2013.01); *H04L 63/10* (2013.01)

(58) Field of Classification Search
CPC ......... H04L 63/20; H04L 63/02; H04L 63/10; G06F 21/53; G06F 21/566; G06F 21/552
See application file for complete search history.

(56) References Cited

U.S. PATENT DOCUMENTS

| 8,032,933 | B2 | 10/2011 | Turley |
| 9,444,842 | B2 | 9/2016 | Porras |
| 2018/0089429 | A1 | 3/2018 | Kamble |
| 2019/0384912 | A1 | 12/2019 | Branson |
| 2020/0314065 | A1 | 10/2020 | Roy |
| 2021/0216908 | A1* | 7/2021 | Lu ........................... H04L 41/40 |
| 2022/0038477 | A1* | 2/2022 | Farrahi Moghaddam .................... G06F 21/552 |
| 2023/0053182 | A1* | 2/2023 | Bertiger ................. H04L 63/10 |

FOREIGN PATENT DOCUMENTS

| CN | 105956473 A | 9/2016 |
| CN | 105024877 A | 4/2018 |
| WO | 2023180169 A1 | 9/2023 |

OTHER PUBLICATIONS

Amr Sayed Omar Abed, Securing Cloud Containers through Intrusion Detection and Remediation, Aug. 2017, Dissertation submitted to the Faculty of the Virginia Polytechnic Institute and State University (Year: 2017).*

(Continued)

*Primary Examiner* — Amie C. Lin
(74) *Attorney, Agent, or Firm* — L. Jeffrey Kelly

(57) ABSTRACT

A method, computer system, and a computer program product for smart SDN is provided. The present invention may include recording and clustering a pod's behavior to generate a behavior transition model for the pod. The present invention may include watching a behavior of the pod and comparing the behavior to the generated behavior transition model. The present invention may include triggering a network policy change based on determining that the behavior of the pod is a misbehavior.

20 Claims, 8 Drawing Sheets

(56) References Cited

OTHER PUBLICATIONS

Chang, "Securing Enterprise Networks with Statistical Node Behavior Profiling", Iowa State University Digital Repository, Graduate Theses and Dissertations, 2009, pp. 1-169.
https://in4it.io/2020/11/18/using-network-policies-to-control-traffic-in-kubernetes/, "Using Network Policies to control traffic in Kubernetes", IN4IT, netpol, Nov. 18, 2020, pp. 1-6.
https://kubernetes.io/blog/2017/10/enforcing-network-policies-in-kubernetes/, "Enforcing Network Policies in Kubernetes", Kubernetes Blog, Oct. 30, 2017, pp. 1-3.
https://kubernetes.io/docs/concepts/services-networking/network-policies/, "Network Policies", Kubernetes, Last modified Dec. 16, 2021, pp. 1-7.
https://www.tigera.io/tigera-products/threat-defense/, "Intrusion Detection (IDS)", Intrusion Detection Tigera, Sep. 3, 2021, pp. 1-9.
Mell et al., "The NIST Definition of Cloud Computing", National Institute of Standards and Technology, Special Publication 800-145, Sep. 2011, pp. 1-7.
Abed, "Securing Cloud Containers through Intrusion Detection and Remediation", Aug. 29, 2017 (Aug. 29, 2017), pp. 1-100, XP93049511, Retrieved from the Internet: URL:https://vtechworks.lib.vt.edu/bitstream/handle/10919/87730/Abed_AS_D_2017.pdf?sequence=1&isAllowed=y, [retrieved on May 25, 2023].
International Searching Authority, "Written Opinion of the International Searching Authority", Patent Cooperation Treaty, Jun. 6, 2023, 12 pgs., International Application No. PCT/EP2023/056753.
Li, et al., "Automatic Policy Generation for Inter-Service Access Control of Microservices", USENIX, USENIX, The Advanced Computing Systems Association, Apr. 1, 2021, (Apr. 1, 2021), pp. 3971-3988, XP061063240, Retrieved from the Internet: URL:http://www.usenix.org/system/files/sec21fall-li-xing.pdf, [retrieved on Apr. 1, 2021].
Meng, "Detecting anomalies in microservices with execution trace comparison", Future Generation Computer Systems, Elsevier Science Publishers. Amsterdam, NL, vol. 116, Nov. 4, 2020 (Nov. 4, 2020), pp. 291-301, XP086401648, ISSN: 0167-739X, DOI: 10.1016/J.FUTURE.2020.10.040, [retrieved on Nov. 4, 2020].

* cited by examiner

SMART SDN FOR INTRUSION PREVENTION

BACKGROUND

The present invention relates generally to the field of computing, and more particularly to software-defined networking (SDN).

To protect enterprise computer networks from intrusions, micro segmentations of the network with network policies guarding the communication between segmentations may be recommended by cybersecurity experts. This may require a network administrator to understand the behaviors of each node in the network, to best segment them, and to adequately define the policies between them.

SUMMARY

Embodiments of the present invention disclose a method, computer system, and a computer program product for smart SDN. The present invention may include recording and clustering a pod's behavior to generate a behavior transition model for the pod. The present invention may include watching a behavior of the pod and comparing the behavior to the generated behavior transition model. The present invention may include triggering a network policy change based on determining that the behavior of the pod is a misbehavior.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
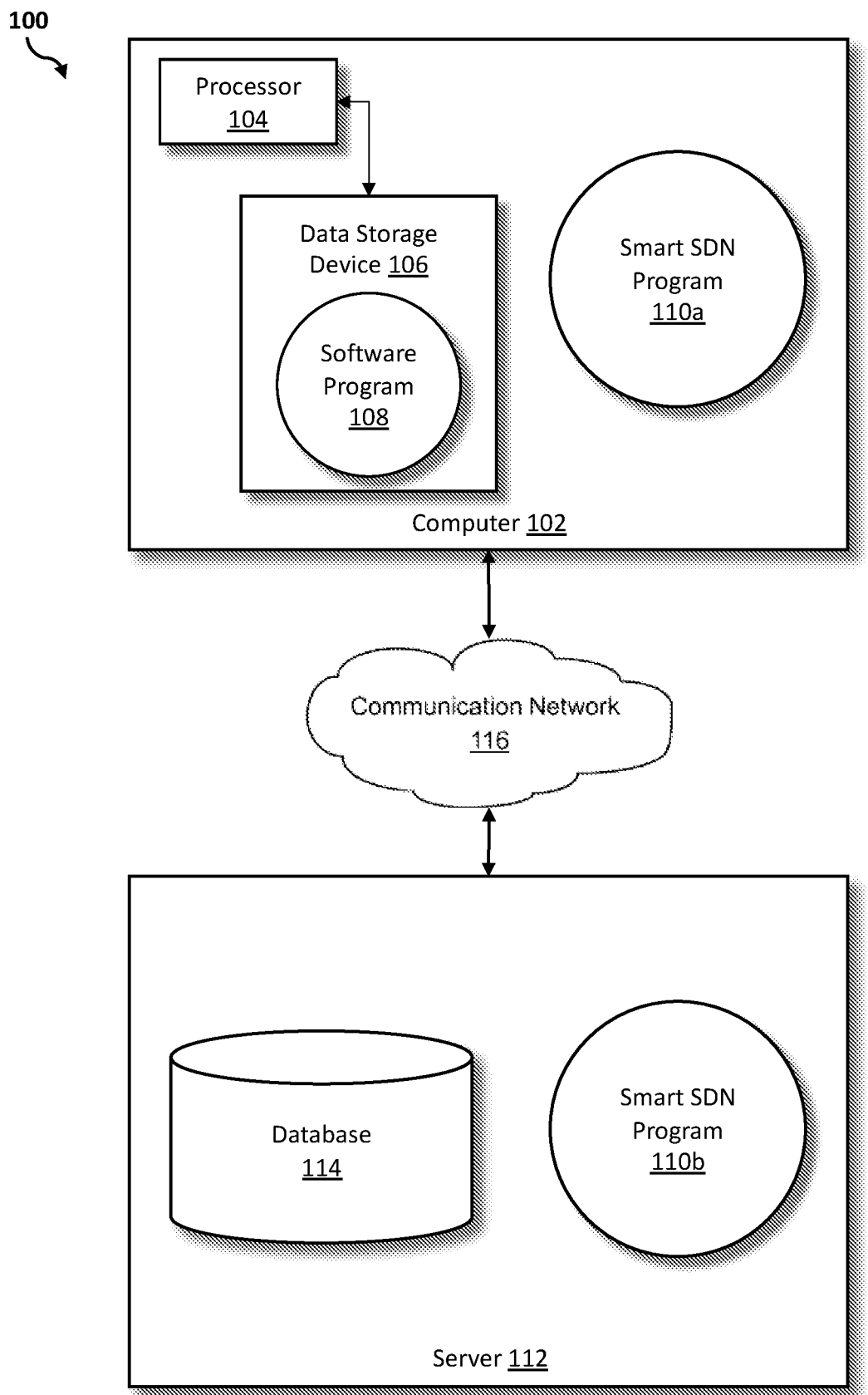
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for smart SDN. As such, the present embodiment has the capacity to improve the technical field of software-defined networking by creating pod-specific dynamic firewalls based on observed pod behaviors. More specifically, the present invention may include recording and clustering a pod's behavior to generate a behavior transition model for the pod. The present invention may include watching a behavior of the pod and comparing the behavior to the generated behavior transition model. The present invention may include triggering a network policy change based on determining that the behavior of the pod is a misbehavior.

As described previously, to protect enterprise computer networks from intrusions, micro segmentations of the network with network policies guarding the communication between segmentations may be recommended by cybersecurity experts. This may require a network administrator to understand the behaviors of each node in the network, to best segment them, and to adequately define the policies between them. However, it may be almost impossible for the network administrator to understand the behaviors of each node in the network.

Therefore, it may be advantageous to, among other things, capture a node's behavior, or a pod's behavior in a Kubernetes® (Kubernetes is a registered trademark of The Linux Foundation in the U.S. and/or other countries) environment, during a service-node go-live event and map out the node's behavior or state transition model by leveraging a clustering algorithm. To map out a node's behavior, the present invention may prepare a list of vectors, run a k-means clustering algorithm and utilize a Calinski Harabsz score. This may enable the creation of micro segmentations around each service node, where micro segmentations are segments with rules prohibiting unknown behaviors (e.g., network traffic which goes out of state or wrong transitions, which may be recognized based on learned behavior from a node's previous recognized behavior). An artificial intelligence (AI) model may then be used to predict a node's current state. An AI model may be a model which predicts a class and/or a state in which a particular set of data belongs to. By comparing the predicted state with a learned behavior transition model, new network policies may be deployed to block any suspicious communications (e.g., malicious intruders, cyber attackers). While traditional solutions may only support hard constraining a node to communicate with pre-defined other nodes, the present invention may enable the constraining of communication between nodes based on a node's behavior during runtime.

According to at least one embodiment, the present invention may be implemented in a software-defined network with micro segmentation. Software-defined networking may enable a computer network to be controlled or programmed using software applications. This control may include both the management and administrative capabilities of components of the computer network as well as the flow of data. A software-defined network may be comprised of multiple layers, including an application layer, a control layer, and an infrastructure layer, where the application layer may contain an organization's network applications, the control layer may be a centralized software-defined networking (SDN)

controller that may act as the intelligence of the SDN, and the infrastructure layer may include physical infrastructure of the network, including switches which forward network traffic to their destinations. In a software-defined network, the SDN controller may be a logically centralized entity that manages the flow of data across the network.

According to at least one embodiment, the present invention may be installed as an additional component inside the enterprise network.

In a software-defined network with micro segmentation, an administrator of the network or information technology (IT) professional may tailor security settings to different types of traffic, creating policies which may limit network and application flows between workloads which may not be explicitly permitted. By applying segmentation rules down to a workload or application, an IT professional may reduce the risk of a network attacker moving from one compromised workload or application to another, thereby decreasing a network attack surface. Segmentation rules may also improve operational efficiency since access control lists, routing rules, and firewall policies are often unwieldy and introduce much management overhead, making policies difficult to scale in rapidly changing environments.

According to at least one embodiment, the present invention may prevent malicious traffic (e.g., an intrusion by a cyber attacker) from moving freely inside a cloud environment. This may be advantageous based on the rise of ransomware and cyber attackers which have tried to ransom enterprises by locking files for money. While an entrance into a network may be difficult in the first place, when a cyber attacker hacks into an enterprise or corporate intranet, the cyber attacker may be able to move freely within the network. Of course, this may cause many problems. However, implementing the present invention in a software defined network (e.g., a cloud-based enterprise network) may forbid hackers (e.g., the cyber attacker) from freely moving around within the enterprise network. While in a traditional network there may have been hardware (e.g., a node, a switch), with the traffic traveling between these pieces of hardware, when the enterprise enters the cloud and becomes more software defined, the link between the pieces of hardware may be dynamic (e.g., creating pod-specific dynamic firewalls based on observed pod behaviors), meaning the link may be altered (e.g., canceled) and data may not be able to travel between defined nodes.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a smart SDN program 110a. The networked computer environment 100 may also include a server 112 that is enabled to run a smart SDN program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the smart SDN program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the smart SDN program 110a, 110b (respectively) to create pod-specific dynamic firewalls based on observed pod behaviors and, more relevantly, misbehaviors. The smart SDN method is explained in more detail below with respect to FIGS. 2 through 5.

Figure 2:
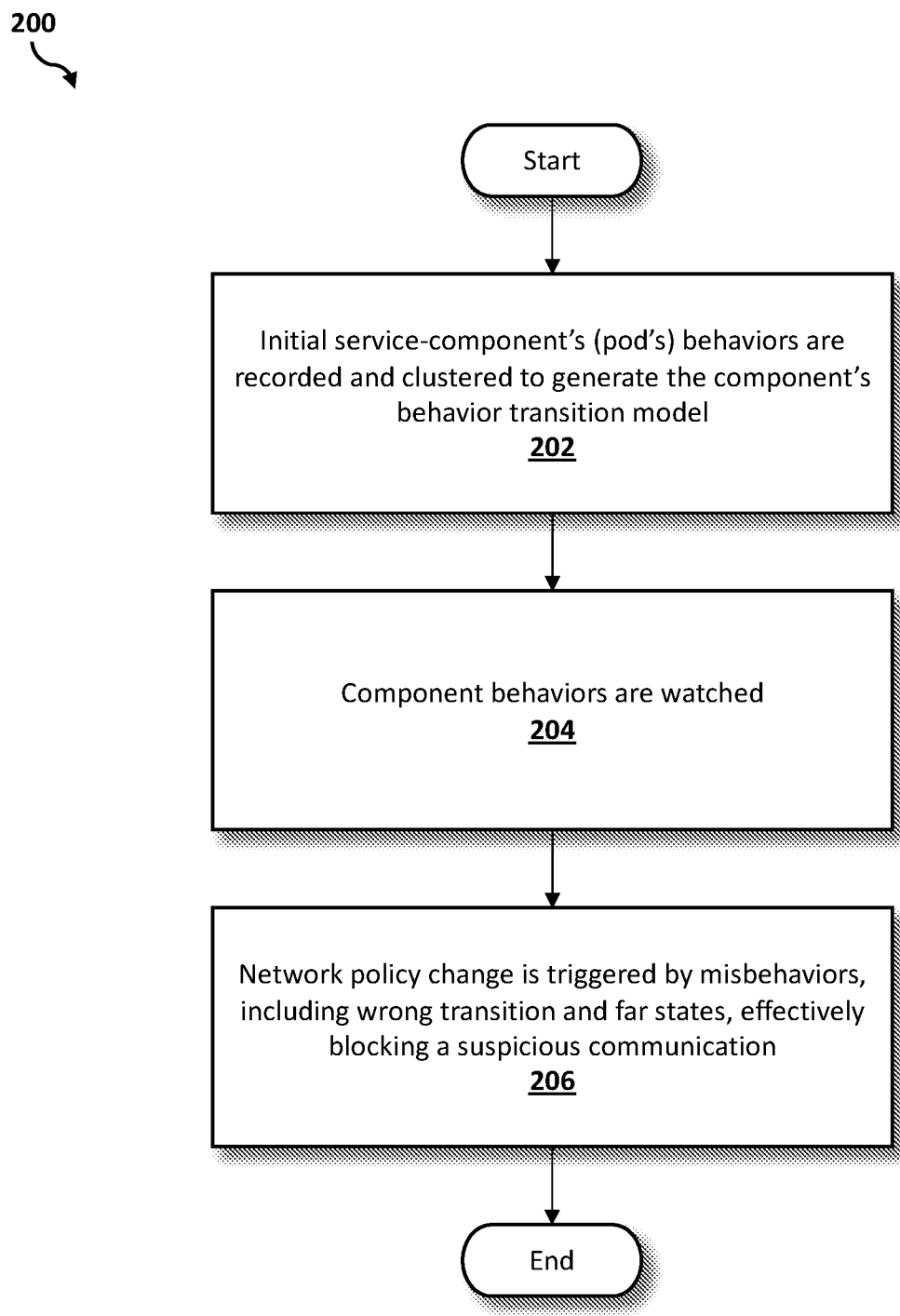
FIG. 2 is an operational flowchart illustrating a process for smart intrusion prevention according to at least one embodiment.

Referring now to FIG. 2, an operational flowchart illustrating the exemplary smart software-defined networking (SDN) process 200 used by the smart SDN program 110a and 110b according to at least one embodiment is depicted.

At 202, an initial service-component's (pod's) behaviors are recorded and clustered to generate the component's behavior transition model. Each network flow may be recorded as a vector and a clustering algorithm may be used to find valid groups and/or clusters. Each group may be called a class or a state. The network flow vector data may be presented as a time series, for example, first presenting vectors clustered as state A, then vectors clustered as state B, and finally a transition from state A to state B. Generating the component's behavior transition model may include the smart SDN program 110a and 110b configuring an artificial intelligence (AI) training period for every newly launched pod in a network. After the training period, a trained AI model may be enabled to block abnormal network flows until a retraining is done. A human user on the network (e.g., an administrator or other user) may review blocked flows and may label them as benign before a next retraining.

There may be two kinds of AI systems, rule-based (including detailed functions that the system carries out) and machine learning-based (which may use a rule-based model to train a machine-learning model by preparing many examples), with a machine learning AI approach potentially being more flexible by not being required to adhere to strict rules. The AI utilized here may detect whether new traffic is normal or abnormal. An advantage of the present implementation may be the precise blocking which may be done by tracking and monitoring all traffic traveling from one pod to another. By being able to detect a deviation from past known behavior of a pod, the blocking may be done at a very precise time, for example, at the moment in which a pod is determined to be compromised by a malicious intruder (e.g., a cyber attacker).

During behavior model training, if the network finds that some of the pod behaviors are not correct, an administrator of the network (i.e., the enterprise network) may request a behavior model adjustment and the behavior model adjustment will likely trigger a retraining of the behavior model. A retraining of the behavior model may be a rerunning of the clustering and scoring algorithms. Once the behavior model is created and trained, the behavior may be watched as is described with respect to step 204 below.

Most cloud systems may be controlled by systems similar to Kubernetes® (Kubernetes is a registered trademark of The Linux Foundation in the U.S. and/or other countries) which enable an administrator to control whether a pod can communicate with another pod using an ingress parameter. To this extent, IP addresses and other parameters may be blocked, namespaces may be listed as exclusive namespaces to communicate with, among other things. However, this typically needs to be done manually, by changing each parameter to protect the enterprise network when a threat is detected. This may be both overwhelming and impossible because, as can be seen from the submarine example described with respect to FIG. 3 below, there may be no way of locking all the doors in a very short period of time. Therefore, it may be advantageous to, among other things, have this AI mechanism installed on the enterprise network to automatically shut those doors when a misbehavior is detected. For this reason, it may be imperative to understand what the normal behavior of a pod is and what a misbehavior is.

According to at least one embodiment of the present invention, the smart SDN program 110*a* and 110*b* may loop through all Kubernetes® (Kubernetes is a registered trademark of The Linux Foundation in the U.S. and/or other countries) deployments in a network and may train the artificial intelligence (AI) system to recognize normal behaviors of the deployments. It should be noted that Kubernetes® is merely one example implementation and any cloud platform that has a specific networking functionality that is similar to a software defined network may be used.

A clustering algorithm may be used to create a vector based on trends of a given pod. The vector may include details such as a destination IP address and a destination port, wherein all network traffic traveling between the port will have the specified parameters. The network traffic may travel to an IP address or a port and may follow a particular protocol (e.g., which defines how the data is encapsulated). The network traffic may also have a network payload and a source IP address (e.g., where the data comes from), an executable statement and an argument (e.g., what the network traffic is related to). For example, the network traffic may be the result of executing a particular application, the instance of the application having certain arguments being specified. There may be many parameters which are related to the particular network traffic, and this alone may form the vector. The vector, therefore, may have many dimensions which each have a value between 0 and 1, with the present invention using a technique to normalize or encode the parameters to turn them into values between 0 and 1.

A state diagram may be created to determine the state of a pod based on the vectors by grouping similar vectors, for example, by comparing each value of the vector and by calculating a distance using a distance formula such as:

$$(q_1-p_1)^2+(q_2-p_2)^2+\ldots+(q_n-p_n)^2$$

Some of the vectors may be determined to belong to the same state because they have parameters which are close to each other (the vectors being either very similar or identical). K-means may be a clustering algorithm used to separate the traffic (e.g., the vectors) into different groups (e.g., states) and to determine a best number of clusters by using the k-means clustering algorithm plus a Calinski Harabsz score. Valid states and valid transitions between states may be detected based on the behaviors of the state diagram.

A dissipation mechanism (e.g., an energy dissipation score to set a dissipation rate when considering distance) may be another function which may be used to determine a distance (e.g., that a state is far from other states) and to determine whether network traffic is normal or abnormal. The energy dissipation score may be:

$$\sqrt{\sum_{i=1}^{n}(q_i - p_i)^2}$$

At 204, the component's behaviors are watched. This includes transition checking each monitored event and measuring the state-distance of each transition.

As described previously, detecting behavior and misbehavior of a pod and limiting how the pod can communicate with other pods on the network may be an improvement over existing technology. This detection may be done by calculating the sum of all distances (e.g., in the case of new traffic in the network, the distance between the new traffic or vector and the center of all other groups may be calculated). There may be a center of each state which may be represented as a vector. The distance between a center of a state and new traffic may be calculated using the distance formula. The distance between each state in the enterprise system may be combined into a rule and it may be determined whether new traffic is too far away from a known state. If the distance exceeds a minimum distance of all other distances, then the new traffic into the network may be considered abnormal and the system may try to block outgoing traffic to other pods from the pod with detected abnormal activity.

At 206, a network policy change is triggered by misbehaviors, including a wrong transition and far states, effectively blocking a suspicious communication. The clustering may take running processes and timing into consideration, effectively blocking a truly malicious communication instead of specific IP addresses.

A behavior model may make a behavior prediction, and based on the behavior prediction, a network policy may be adjusted to limit outgoing traffic especially in an area of the network (i.e., the enterprise network) in which a pod may be compromised. Before traffic may be limited, behavior model training must be done at, for example, an application's go-live or testing phase on the network (as described previously with respect to step 202 above). This may be the best time to capture a behavior model because while under testing, there may be no way for a pod to be compromised. Therefore, at this time, a behavior model for the application may be captured and once the application (or service) goes live, the present invention may be turned "on," so to speak, so that any malicious activity following the go-live or testing phase may be captured. At that time, the present invention may immediately detect the malicious activity and after a compromise of a single pod, other parts of the network may be protected (e.g., not infected or affected), with the compromise being limited to an infected pod.

As described previously, in a cloud environment, there may be no physical link between nodes, with the entirety of the network being virtual. In a cloud environment, there may be the different pods (described above) which may house different applications. A malicious intruder (e.g., a hacker or cyber attacker) may travel into a pod through a particular vulnerability (e.g., when an application running on a particular pod has a vulnerability that a hacker may attack, the hacker will enter this pod and end up in the pod where the application is located). Thus, the goal may be to protect the other pods (e.g., other part of the enterprise network) from the compromised part. A way to do this may be to reroute the network around this particular pod so that the other pods may not be affected by this compromise. For example, likewise, if there were firewalls enacted between pods, this may forbid communication between the pods. The protection afforded by the present invention may be initiated by an AI mechanism for determining whether one of the pods has been compromised (as described previously with respect to step 202 above). This may be done by analyzing a behavior of the pod and determining that the pod is exhibiting a misbehavior or a behavior that is not recognized (as described previously with respect to step 204 above and with respect to FIG. 4 below). This may be in instances where the enterprise network contains multiple pods (e.g., multiple parts of the system). In order to disallow communication between pods in a scenario where part of the system (e.g., a single pod) is compromised, which again may be determined by the present invention based on monitoring of the pod's behavior to recognize a misbehavior, a link between the compromised pod and any connected pods may be disabled.

Continuing with the exemplary embodiment introduced in step 202 above, abnormal traffic may be blocked until the smart SDN program 110a and 110b is retrained and a non-abnormal finding is made. This may result in pod-specific resistance for new traffic on the network.

Figure 3:
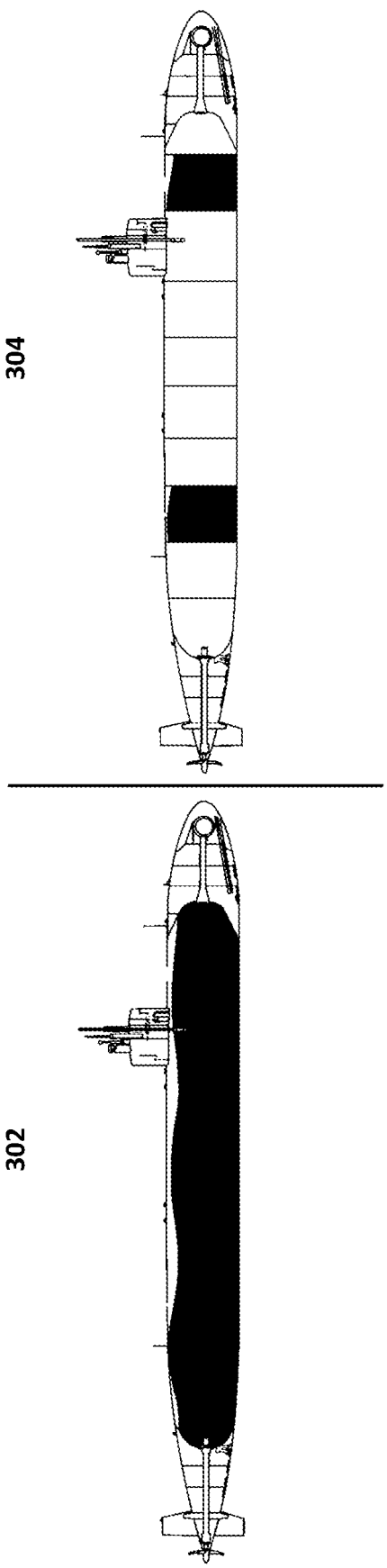
FIG. 3 is an exemplary embodiment of micro segmentation according to at least one embodiment.

Referring now to FIG. 3, an exemplary embodiment of micro segmentation according to at least one embodiment is depicted. The current state of cyber attacking on an enterprise network may be synonymous with the submarine 302 depicted in FIG. 3. For example, if the submarine 302 begins to take on water, the water may flow all over and the submarine may sink quickly. However, if there is micro segmentation within the submarine, as depicted by the submarine 304, even if there are one or two areas which are flooded, it is very likely that the water may be contained within these areas and the entire submarine may not take on water and sink. Likewise, if an enterprise network is able to lock certain areas, a cyber attacker may not be able to travel to those areas and cause damage to the entire enterprise network.

Figure 4:
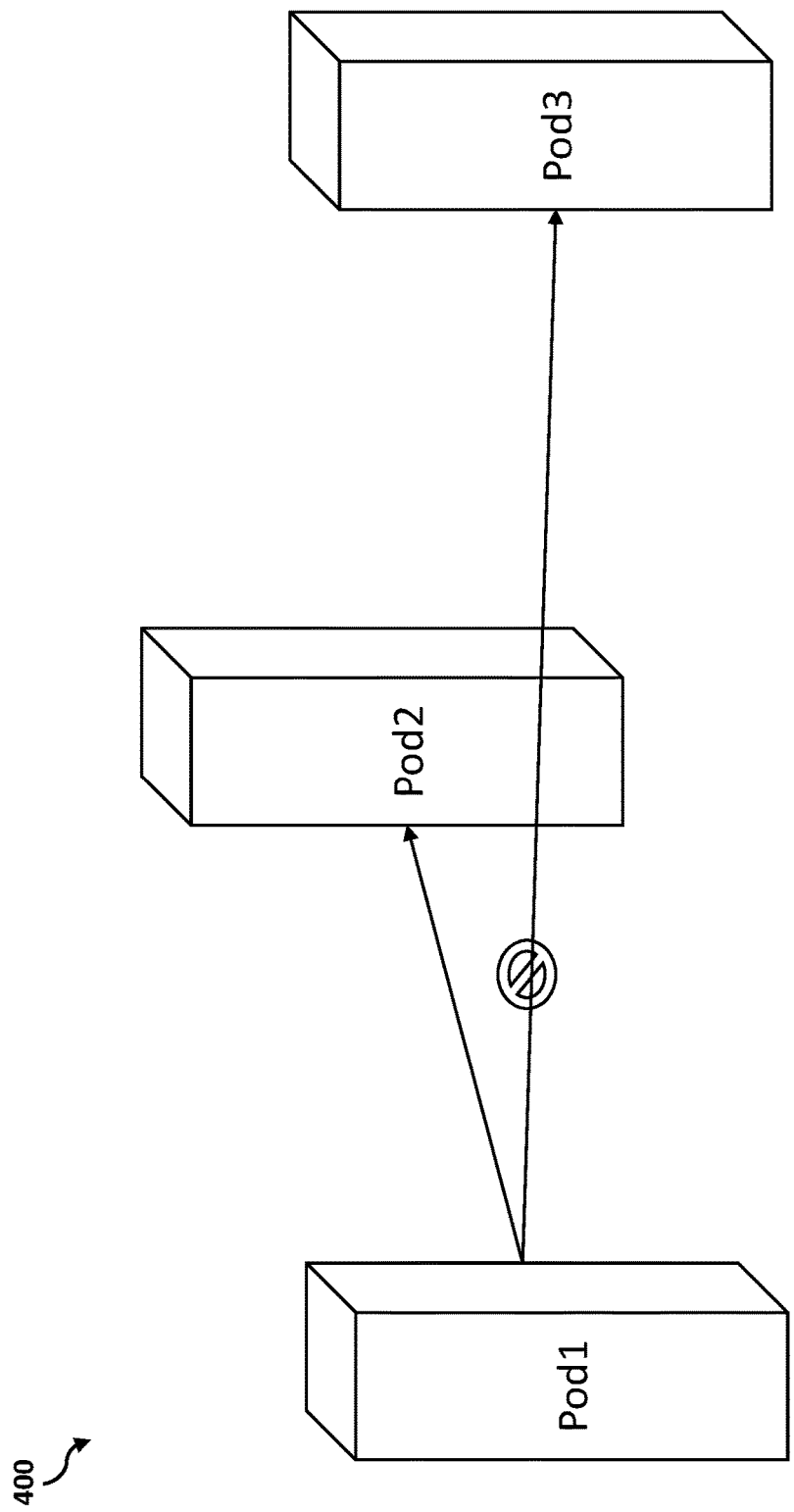
FIG. 4 is an exemplary embodiment of an enterprise network containing multiple pods according to at least one embodiment.

Referring now to FIG. 4, an exemplary embodiment of an enterprise network containing multiple pods according to at least one embodiment is depicted. Here, a behavior of a pod is analyzed using SysFlow Telemetry, for example, to determine whether the pod is exhibiting a misbehavior or a behavior that is not recognized. The enterprise network in this example contains multiple pods (e.g., multiple parts of the system) with a behavior monitor determining that a behavior of Pod 3 is not recognized and that the link between the compromised pod and the connected Pod 1 should be disconnected.

Figure 5:
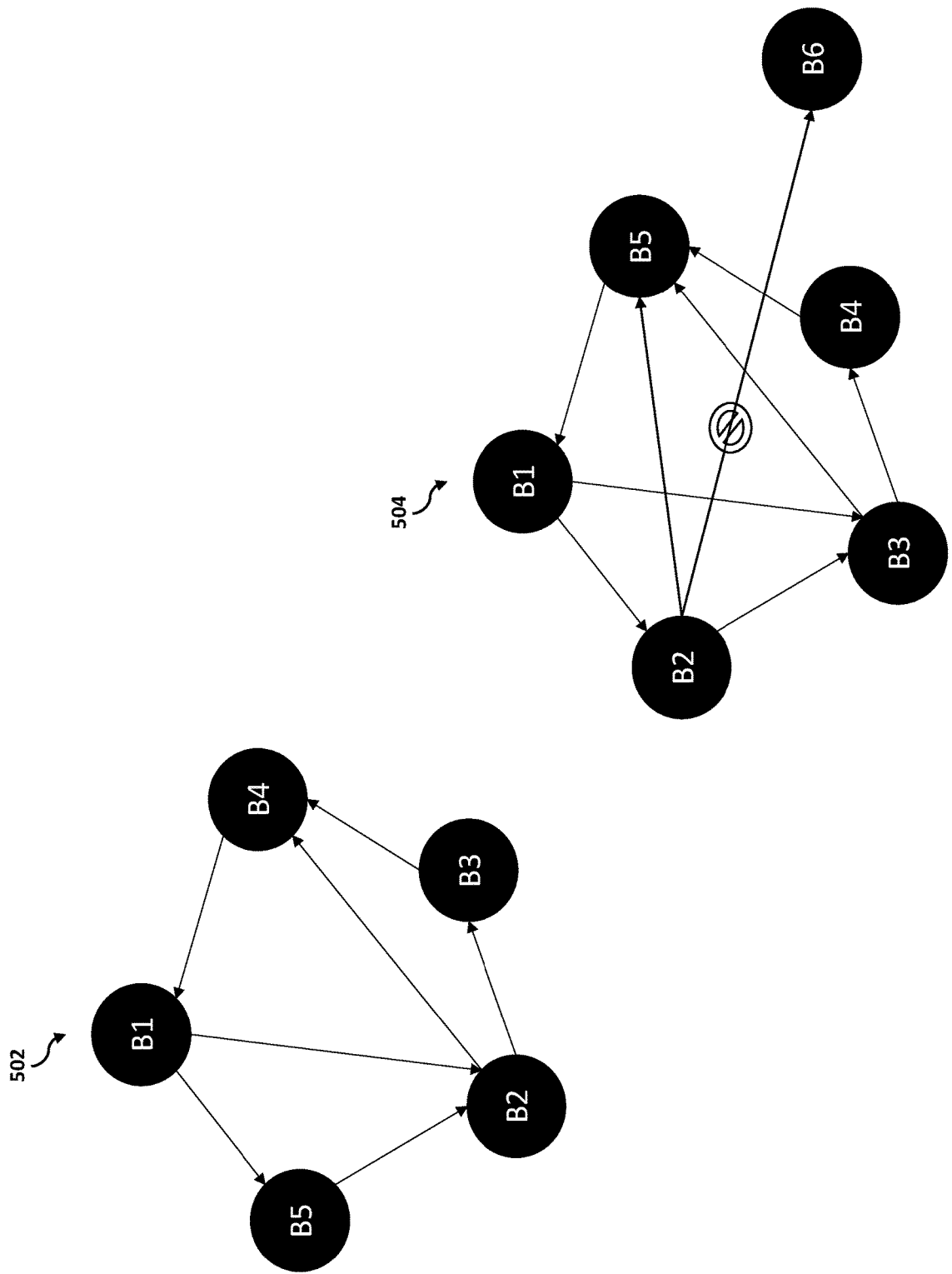
FIG. 5 is an exemplary embodiment of a state diagram depicting service behavior and misbehavior according to at least one embodiment.

Referring now to FIG. 5, an exemplary embodiment of a state diagram depicting service behavior and misbehavior according to at least one embodiment is depicted. As described previously, each network flow may be recorded as a vector and a clustering algorithm may be used to find valid groups and/or clusters. Each group may then be called a class or state (with 502 depicting five states and 504 depicting six states). The new state B6 in 504 is determined to be located a far distance from other states (e.g., based on the sum of all distances or the energy dissipation score) and is thus determined to be a misbehavior of the enterprise network. A classification of the state transition as a misbehavior may also have been done for a transition that has never been seen on the enterprise network. This misbehavior will trigger a network policy change which may be effective immediately upon the identification of the misbehavior.

It may be appreciated that FIGS. 2 through 5 provide only an illustration of one embodiment and do not imply any limitations with regard to how different embodiments may be implemented. Many modifications to the depicted embodiment(s) may be made based on design and implementation requirements.

Figure 6:
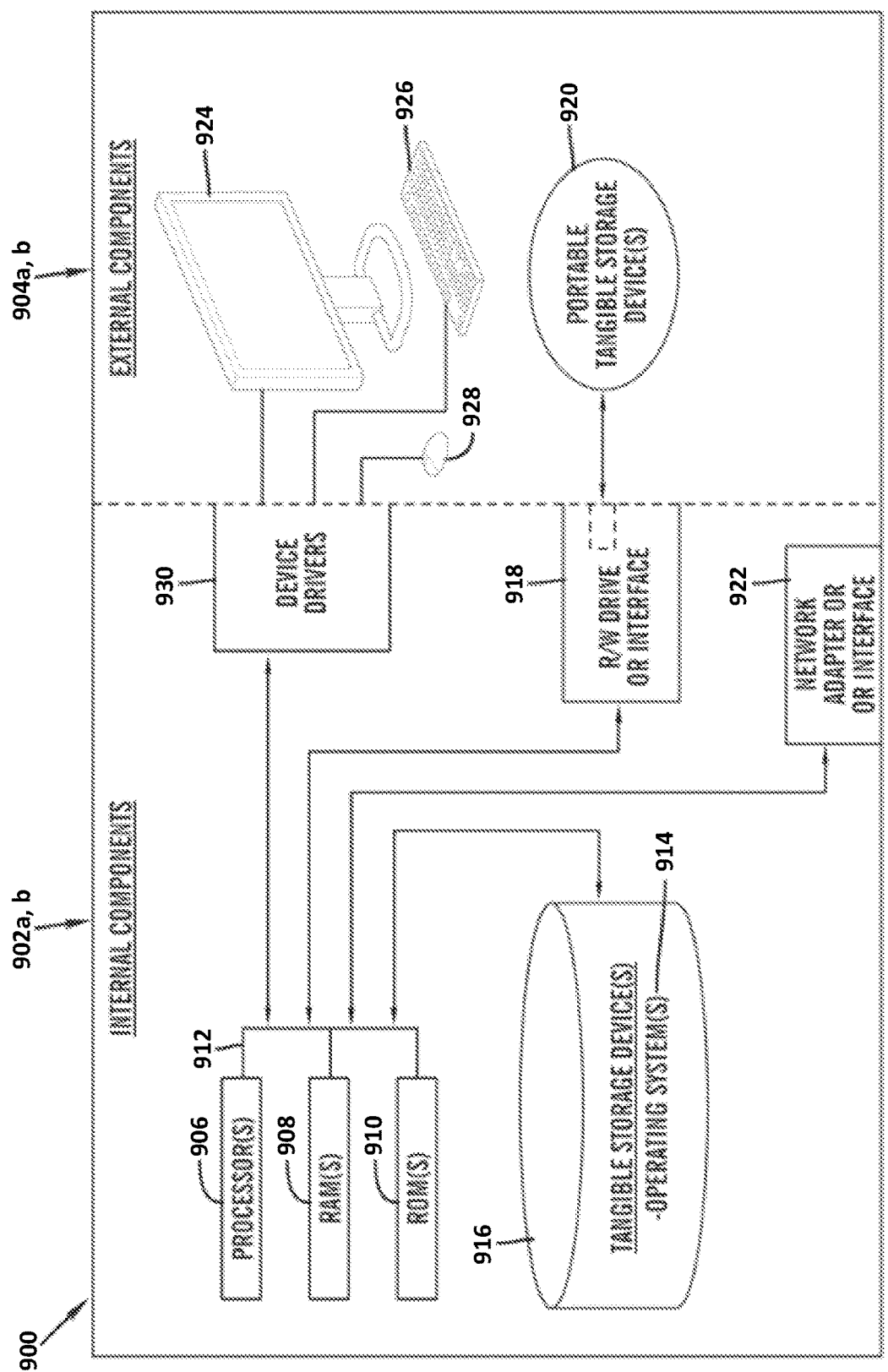
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 6. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the smart SDN program 110a in client computer 102, and the smart SDN program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the smart SDN program 110*a* and 110*b* can be stored on one or more of the respective portable computer-readable tangible storage devices 920, read via the respective R/W drive or interface 918 and loaded into the respective hard drive 916.

Each set of internal components 902*a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the smart SDN program 110*a* in client computer 102 and the smart SDN program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the smart SDN program 110*a* in client computer 102 and the smart SDN program 110*b* in network server computer 112 are loaded into the respective hard drive 916. The network may comprise copper wires, optical fibers, wireless transmission, routers, firewalls, switches, gateway computers and/or edge servers.

Each of the sets of external components 904*a, b* can include a computer display monitor 924, a keyboard 926, and a computer mouse 928. External components 904*a, b* can also include touch screens, virtual keyboards, touch pads, pointing devices, and other human interface devices. Each of the sets of internal components 902*a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
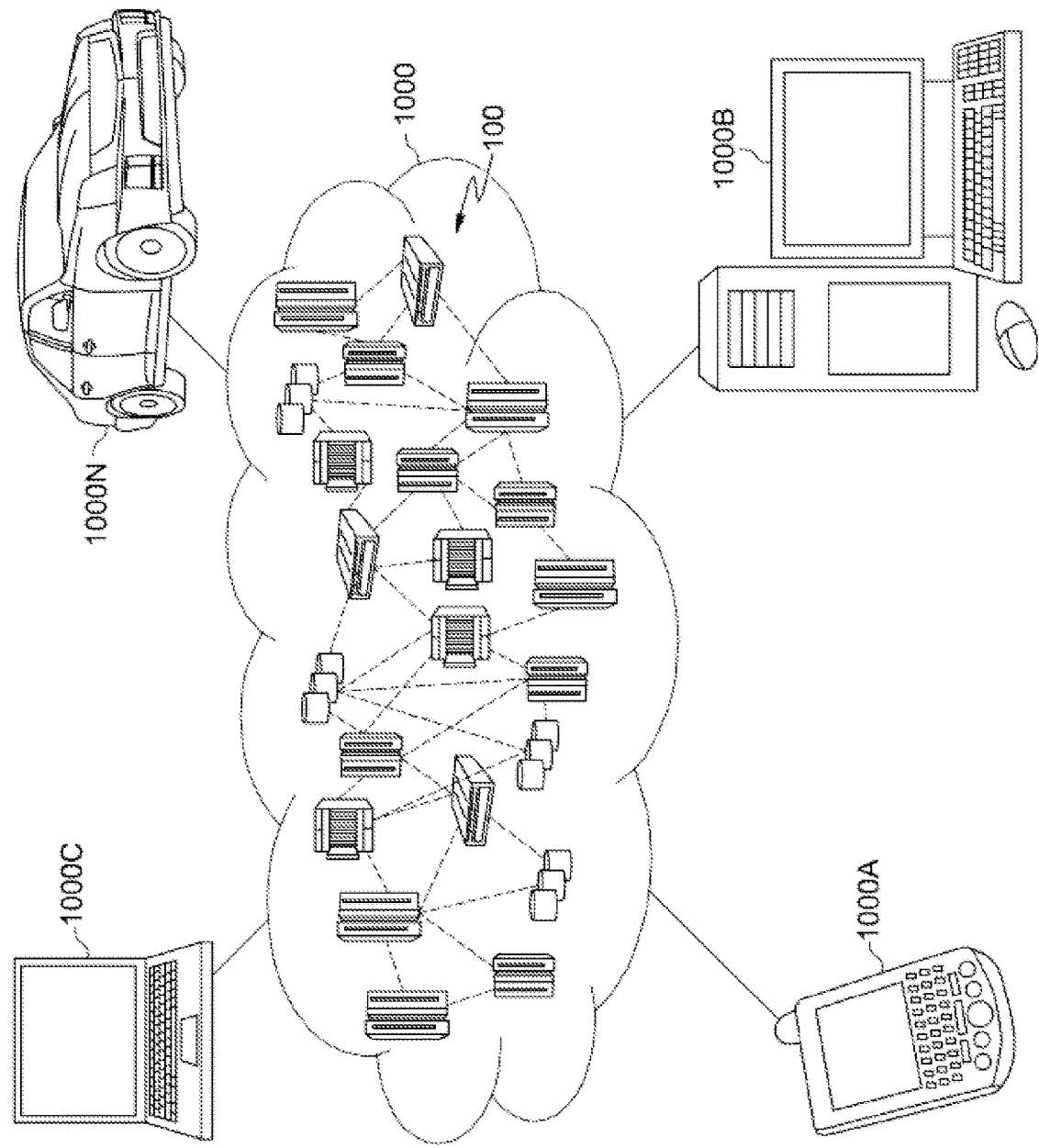
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
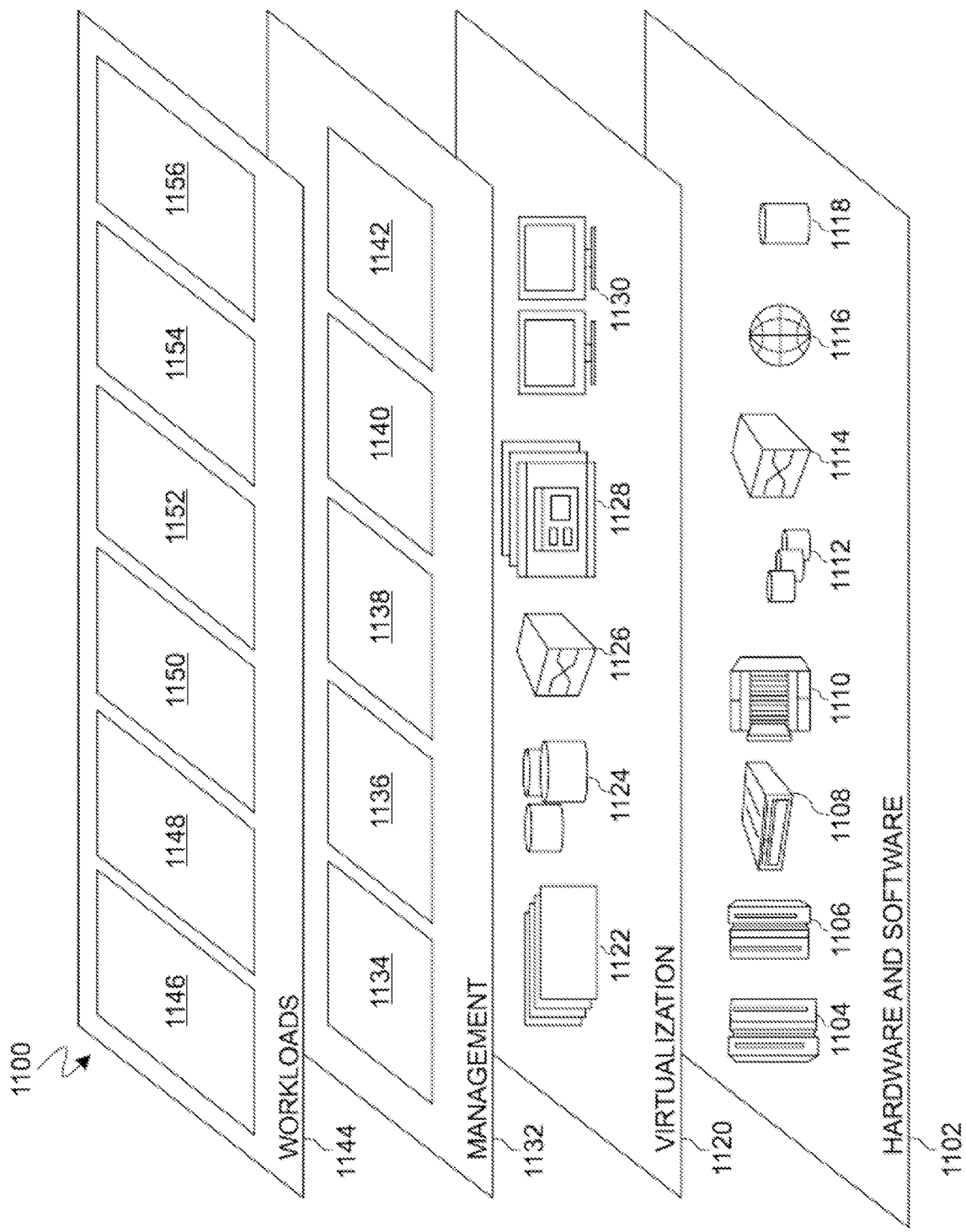
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and smart SDN 1156. A smart SDN program 110a, 110b provides a way to create pod-specific dynamic firewalls based on observed pod behaviors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for smart software-defined networking, the method comprising:
    recording and clustering a single pod's behavior to generate a behavior transition model for only the single pod, wherein the single pod's behavior and each network flow are recorded as a vector;
    watching the behavior of the single pod and comparing the behavior of the single pod to the generated behavior transition model;
    determining the single pod is compromised based on determining that the behavior of the single pod is a misbehavior, wherein the determination of the misbehavior comprises determining that a distance between the vector of the single pod's behavior and a center of all the vectors of the network flow exceeds a minimum distance of all distances between the vectors of the network flow;
    disabling links between the compromised single pod and any pods connected to the compromised single pod; and
    triggering a network policy change based on the determination that the behavior of the single pod is a misbehavior.

2. The method of claim 1, wherein the vector is presented as a time series depicting at least one state behavior and at least one state transition.

3. The method of claim 2, wherein a clustering algorithm is used to create the vector based on at least one observed trend of the single pod.

4. The method of claim 2, wherein a state diagram is created based on the vector by comparing each value of the vector to each value of a second vector and by utilizing a distance formula.

5. The method of claim 1, wherein generating the behavior transition model further comprises:
    using an artificial intelligence model to learn the behavior of the single pod, wherein the artificial intelligence model detects whether a new traffic pattern is normal or abnormal.

6. The method of claim 1, wherein triggering the network policy change further comprises:
    creating at least one pod-specific dynamic firewall.

7. The method of claim 1, wherein triggering the network policy change blocks a suspicious communication from traveling to a second pod.

8. A computer system for smart software-defined networking, comprising:
one or more processors, one or more computer-readable storage medium, and program instructions stored on at least one of the one or more computer-readable storage medium to cause the processor to perform operations comprising:
recording and clustering one pod's behavior to generate a behavior transition model for only the one pod, wherein the one pod's behavior and each network flow are recorded as a vector;
watching the one pod's behavior and comparing the one pod's behavior to the generated behavior transition model;
determining the one pod is compromised based on determining that the one pod's behavior is a misbehavior, wherein the determination of the misbehavior comprises determining that a distance between the vector of the one pod's behavior and a center of all the vectors of the network flow exceeds a minimum distance of all distances between the vectors of the network flow;
disabling links between the compromised one pod and any pods connected to the compromised one pod; and
triggering a network policy change based on the determination that the one pod's behavior is a misbehavior.

9. The computer system of claim 8, wherein the vector is presented as a time series depicting at least one state behavior and at least one state transition.

10. The computer system of claim 9, wherein a clustering algorithm is used to create the vector based on at least one observed trend of the one pod.

11. The computer system of claim 9, wherein a state diagram is created based on the vector by comparing each value of the vector to each value of a second vector and by utilizing a distance formula.

12. The computer system of claim 8, wherein generating the behavior transition model further comprises:
using an artificial intelligence model to learn the behavior of the one pod, wherein the artificial intelligence model detects whether a new traffic pattern is normal or abnormal.

13. The computer system of claim 8,
wherein determining the one pod is compromised comprises:
creating at least one pod-specific dynamic firewall.

14. The computer system of claim 8,
wherein disabling links between the compromised one pod and any pods connected to the compromised one pod blocks all outgoing communication from the compromised one pod.

15. A computer program product for smart software-defined networking, comprising:
one or more computer-readable storage medium and program instructions stored on at least one of the one or more computer-readable storage medium, the program instructions executable by a processor to cause the processor to perform operations comprising:
recording and clustering a single pod's behavior to generate a behavior transition model for only the single pod, wherein the single pod's behavior and each network flow are recorded as a vector;
watching the behavior of the single pod and comparing the behavior of the single pod to the generated behavior transition model;
determining the single pod is compromised based on determining that the single pod's behavior is a misbehavior, wherein the determination of the misbehavior comprising determining that a distance between the vector of the single pod's behavior and a center of all the vectors of the network flow exceeds a minimum distance of all distances between the vectors of the network flow;
limiting how the single pod can communicate with other pods on the network by disabling links between the compromised single pod and any pods connected to the compromised single pod; and
triggering a network policy change based on the determination that the single pod's behavior is a misbehavior.

16. The computer program product of claim 15, wherein the vector is presented as a time series depicting at least one state behavior and at least one state transition.

17. The computer program product of claim 16, wherein a clustering algorithm is used to create the vector based on at least one observed trend of the single pod.

18. The computer program product of claim 16, wherein a state diagram is created based on the vector by comparing each value of the vector to each value of a second vector and by utilizing a distance formula.

19. The computer program product of claim 15, wherein generating the behavior transition model further comprises:
using an artificial intelligence model to learn the behavior of the single pod, wherein the artificial intelligence model detects whether a new traffic pattern is normal or abnormal.

20. The computer program product of claim 15,
wherein limiting how the single pod can communicate with other pods on the network comprises:
creating at least one pod-specific dynamic firewall.

* * * * *